INVENTORS
GORDON V. BROWN
ALLEN B. REPP
BY

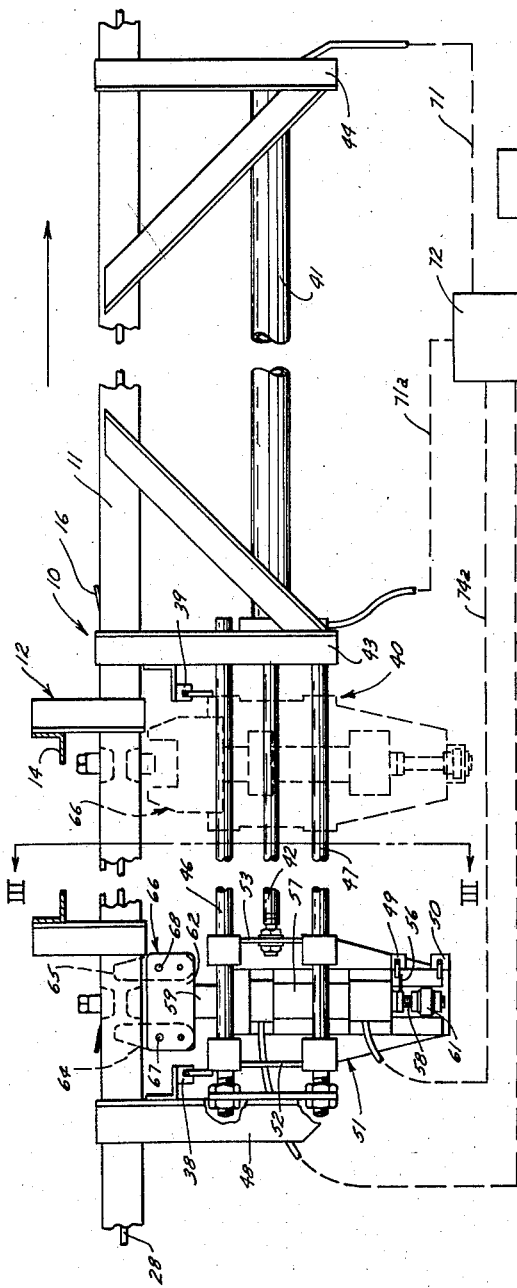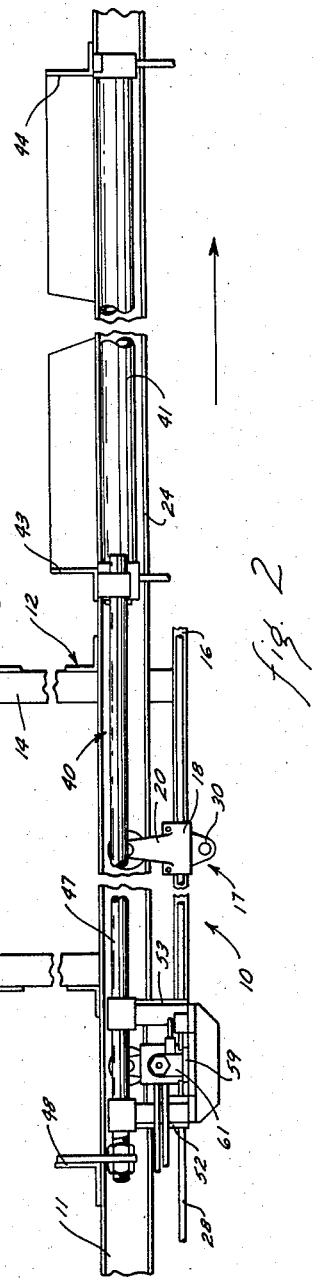

ATTORNEYS

Oct. 13, 1959 G. V. BROWN ET AL 2,908,378
CONVEYOR POSITIONING APPARATUS
Filed May 20, 1957 4 Sheets-Sheet 4
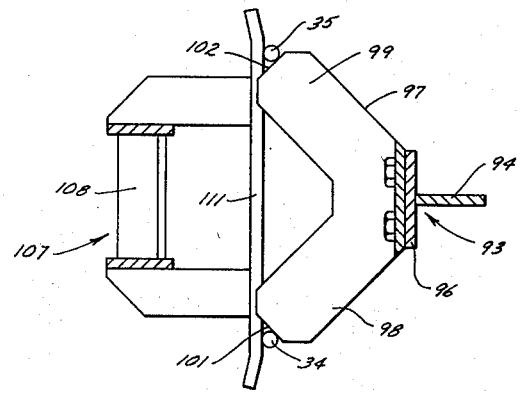
fig. 8
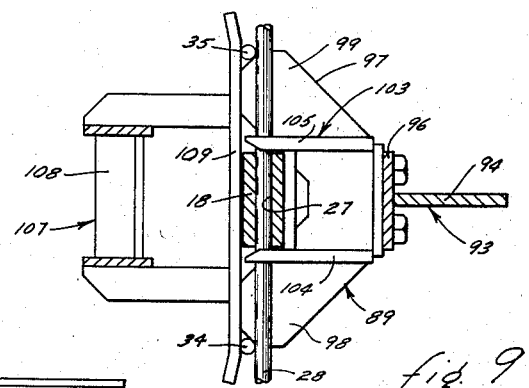
fig. 9
fig. 11
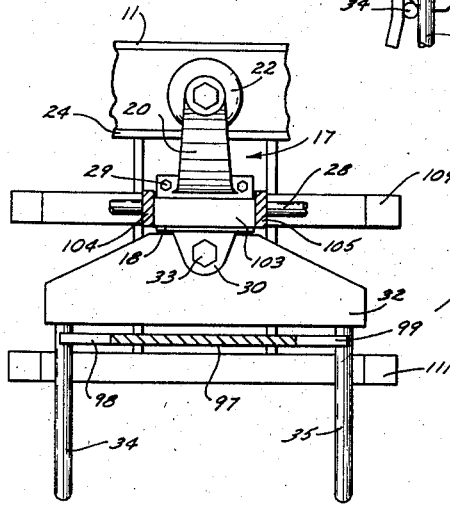
fig. 10
INVENTORS
GORDON V. BROWN
ALLEN B. REPP
BY
Woodhams Blanchard & Flynn
ATTORNEYS United States Patent Office 2,908,378
Patented Oct. 13, 1959

2,908,378

CONVEYOR POSITIONING APPARATUS

Gordon V. Brown, Grosse Ile, and Allen B. Repp, Dearborn, Mich.

Application May 20, 1957, Serial No. 660,310

8 Claims. (Cl. 198—135)

This invention relates to conveyor mechanisms and it particularly relates to apparatus for effecting intermittent advancing movement of said conveyor, and of means supported thereby, and it further relates to a device cooperating with such intermittently moving conveyor for positively locating said means supported by said conveyor in predetermined positions with respect to structure external of the conveyor.

In automation work involving conveyors, there have been many attempts to use cable or chain type conveyors in connection with loading and/or unloading devices, or other devices for automatically processing work items carried by or on said conveyor. However, an extremely persistent problem has been that of locating and positioning such work items, as they are moved intermittently along or by the conveyor, sufficiently accurately with respect to externally positioned equipment, such as a loading or unloading device, that the operation of such device with respect to the work item and with respect to the conveyor on which the work item is carried, can be sufficiently accurate to provide an overall reliable and automatic piece of equipment.

Many attempts have been made to meet this problem by controlling the power applied to the conveyor but these have either been unduly complicated or have been insufficiently effective. For example, cam operated mechanical devices are normally not sufficiently rapid in operation to satisfy the high speed requirements of such automated conveyor equipment. Devices using brakes are not sufficiently accurate in locating the starting and stopping points precisely with respect to the position of items on the conveyor. Devices involving electrical control are likewise insufficiently accurate in starting and stopping the equipment at precisely predetermined points to be acceptable for many uses. Thus, many operations which could desirably be conveyorized have necessarily been confined to hand moved pallets or manually moved trucks in order to obtain the desired accuracy of coordinating the stopping and starting thereof with the operation of other kinds of equipment.

A further and related problem arises in the driving of such a conveyor with sufficient accuracy that it is possible for such positioning equipment to operate effectively. As stated above in connection with the positioning and guide mechanism, previous attempts to drive conveyor equipment intermittently and in precise stepwise relationship to other apparatus has provided a series of problems which problems, insofar as we are aware, have not been properly solved. Such intermittent drive mechanism is either unreasonably complicated or does not operate with sufficient speed and precision to be acceptable and hence, for this reason also, many manufacturing operations which could otherwise well be conveyorized, have continued to be subject primarily to manual control.

Accordingly, the objects of the invention are:

(1) To provide conveyor indexing and positioning equipment capable of intermittently moving a conveyor and precisely positioning an item of work held thereby with relation to a location external of the conveyor equipment in such a manner that the conveyor may be accurately loaded or unloaded by automatic equipment or in such a manner that an operation may be performed upon the work item without the necessity of removing it from the conveyor.

(2) To provide conveyor indexing and work positioning apparatus, as aforesaid, which will be applicable without material change to a substantial variety of specific conveyor and work supporting constructions.

(3) To provide conveyor indexing and work positioning apparatus, as aforesaid, which will be relatively inexpensive to construct.

(4) To provide conveyor indexing and work positioning apparatus, as aforesaid, which will operate over long periods of time with a high degree of accuracy and requiring only minimum maintenance.

(5) To provide conveyor indexing and work positioning apparatus, as aforesaid, capable of operating with a high degree of accuracy.

(6) To provide conveyor indexing and work positioning apparatus, as aforesaid, which can be operated effectively from a variety of different types of power sources.

(7) To provide conveyor indexing and work positioning apparatus, as aforesaid, which will work accurately over a long period of time with a minimum of maintenance being necessary with respect thereto.

(8) To provide conveyor indexing and work positioning apparatus, as aforesaid, which can be utilized with an extremely wide variety of types of products without any modifications at all in the apparatus needed but which can be rendered adaptable for use with still further types of products by only an extremely small change in the design of a given piece of apparatus.

Other objects and purposes of the invention will be apparent to persons acquainted with apparatus of this general type upon a reading of the following description and inspection of the accompanying drawings.

In the drawings:

Figure 1 is a broken top plan view of a conveyor mechanism including apparatus for effecting intermittent uni-directional movement of means supported by said conveyor mechanism.

Figure 2 is a broken side elevational view of the structure shown in Figure 1.

Figure 8 is a sectional view taken along the line VIII—VIII of Figure 7.

Figure 9 is a sectional view taken along the line IX—IX of Figure 7.

Figure 10 is a sectional view taken along the line X—X of Figure 7.

Figure 11 is a view similar to that shown in Figure 8 and disclosing an alternate structure.

*General description*

The indexing apparatus of this invention comprises a platform which is arranged for movement parallel with the intended movement of the conveyor and means for moving said platform reciprocably such that its intermittent movements in a selected direction correspond in speed, direction and length with the intermittent movements which it is desired to effect in the conveyor. An engaging device is movably carried on said platform for selectively engaging the conveyor at the proper intervals to move it along with said platform for effecting the desired intermittent movement of the conveyor. The movement of the platform as well as the movement of the engaging device is conveniently accomplished by pressure fluid means but is not limited thereto.

The positioning device of the invention comprises a positioning head movable substantially perpendicular to the line of motion of the conveyor and carrying two engaging means thereon. The first of said engaging means engages a section of the conveyor structure, such as a predetermined portion of a cable, chain or means secured thereto, whereby said section of the conveyor is held with a high degree of rigidity in a predetermined location. The second engaging device simultaneously engages work supporting devices, such as a pair of work supporting hangers extending downwardly from the conveyor cable or chain, and causes them to be positively positioned with respect to a suitable back-up plate. Thus, the work carried on and by said hangers will be positively positioned with respect to an external device, such as a device for loading work items onto said conveyor or a device for unloading work items from said conveyor, and the operation of such external mechanism may proceed accurately with respect to the location of the work items carried by the conveyor.

For the purpose of convenience in description, the terms "support," "lower," and derivatives thereof, will have reference to the structure, and parts thereof, in their normal positions of operation and as appearing in Figures 2, 3, 7 and 10. The terms "forward," "rearward," and derivatives thereof, will have reference, respectively to the rightward and leftward ends of the structure appearing in Figure 1, and to the direction of movement of the conveyor mechanism, as indicated by the arrows in Figures 1 and 2.

The terms "horizontal," "vertical" and similar terms denoting direction or position will have reference to the structure as appearing in Figure 2, which is its normal position of operation. The terms "inner," "outer," and derivatives thereof, will have reference to the geometric center of the structure or parts thereof, which embodies the invention.

*Detailed construction*

Figure 3:
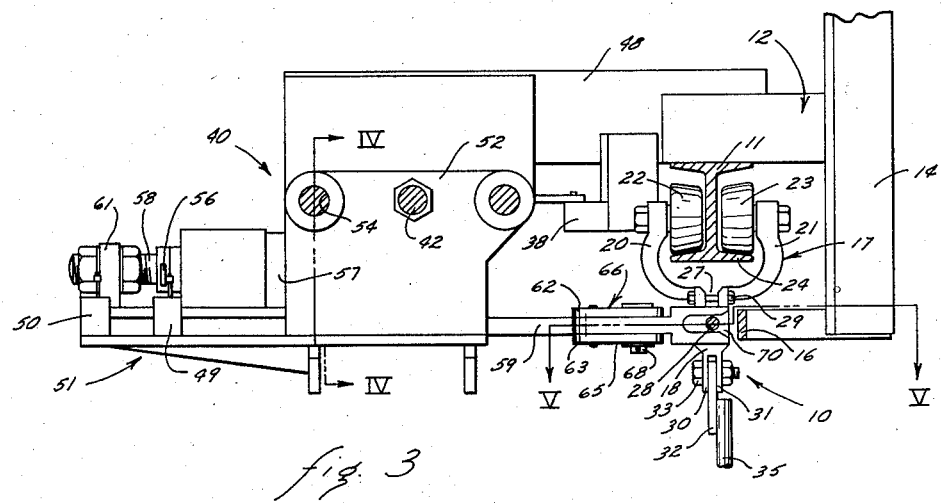
Figure 3 is a sectional view taken along the line III—III of Figure 1.

The conveyor mechanism 10 (Figures 1 and 2) is comprised of an elongated rail 11 which may be in the form of an I-beam, as shown in Figure 3. Said rail 11 may be supported by any convenient means such as the support brackets 12 which in turn may be secured to the ceiling 13 of a room in which said conveyor mechanism 10 is installed. Said brackets 12 have vertical members 14 which extend below said rail 11 where they are secured to and support a substantially horizontal guide bar 16 parallel with said rail 11.

The conveyor trolley 17, shown in Figures 2, 3 and 10, may be substantially the same as shown in our Patent No. 2,766,873. Said trolley 17 is comprised of a cable clamp 18 having upwardly extending arms 20 and 21 upon which the rollers 22 and 23 are rotatably and coaxially supported, respectively. Said rollers are arranged for engaging the upper surface of the lower flange 24 of the rail 11 and thereby supporting the trolley 17 for movement lengthwise of the rail 11.

The upper end of said cable clamp 18 (Figure 3) is provided with a recess 27 which extends upwardly into, and communicates with, the space between the arms 20 and 21. A conveyor cable 28 is snugly received into the recess 27 where it is held by means including the bolts 29 against accidental movement with respect to the trolley 17. A pair of spaced lugs 30 and 31 extend downwardly from the cable clamp 18, and a cross bar 32 is disposed between said lugs. A pivot bolt extends through both lugs and the cross bar 32 near the center thereof. Said lugs are arranged so that said cross bar 32 is substantially parallel with said cable 28 in this particular embodiment. Work engaging means such as the hooks 34 and 35 (Figure 9) are secured to, and hang downwardly from, the cross bar 32 at the opposite ends thereof. For further details with respect to the conveyor trolley 17, reference is made to the above mentioned Patent No. 2,766,873.

The conveyor cable 28 is held substantially parallel with, and directly below, the rail 11 by a plurality of the conveyor trolleys 17, which are each mounted upon said rail 11, as discussed hereinabove. The guide bar 16 is arranged so that the cable clamp 18 of said trolleys 17 move along a path adjacent to, and parallel with, said guide bar. The rail 11, hence the conveyor cable 28 supported upon and moved therealong, may follow any convenient, conventional pattern or path, including slopes and curves, which may be required by the particular use of the conveyor mechanism. The nature of the structure is such that the rail 11 and conveyor cable 28 will normally be endless and continuous. It will become apparent that the portion of said rail, hence, the adjacent movement path of said cable, will be substantially straight in the region thereof which is associated with the indexing apparatus 40, which will now be described.

*The indexing apparatus*

The indexing apparatus 40 is comprised of a power cylinder 41 having a piston or actuating rod 42 operable by said power cylinder 41 in a substantially conventional manner. Said power cylinder 41 is mounted substantially parallel with, and spaced sidewardly from, the rail 11 by means of the frame members 43 and 44 which are secured both to said power cylinder 41 and upon the rail 11. Accordingly, the piston rod 42 is reciprocated by the power cylinder 41 in a direction which is also substantially parallel with said rail 11. A pair of parallel substantially horizontal guide rods 46 and 47 are mounted at their rearward ends upon the forward frame member 43 and at their forward ends upon the bracket 48 which is in turn supported upon the rail 11. In this particular embodiment, the guide rods 46 and 47 are disposed on opposite lateral sides of the piston rod 42 and extend beyond the outer end of the piston rod 42 when it is in its extended condition.

Figure 4:
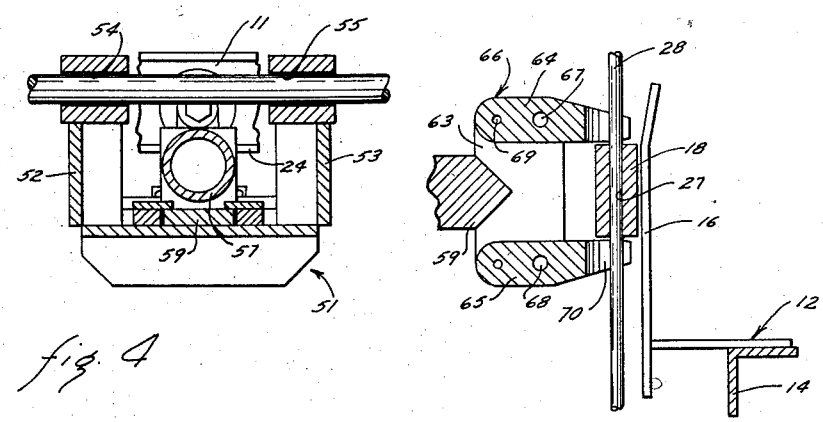
Figure 4 is a sectional view taken along the line IV—IV of Figure 3.
Figure 5:
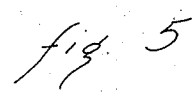
Figure 5 is a sectional view taken along the line V—V of Figure 3.

A substantially horizontal platform 51 (Figures 1, 3 and 4), is provided with a pair of upwardly extending support members 52 and 53 each of which has a pair of cylindrical, bushed openings 54 and 55. Each of said guide rods 46 and 47 is received through one of the bushed openings 54 and 55 in each of the support members 52 and 53, for slidably supporting the platform 51. The outer end of the piston rod 42 is secured to the rearward support member 53 whereby operation of the power cylinder 41 will effect a movement of the platform 51 along the guide rods 46 and 47. A pair of micro-switches 38 and 39 (Figure 1) are mounted upon the bracket 48 and forward frame member 43, respectively, adjacent to the guide rod 46 for reasons appearing hereinafter.

A power cylinder 57 is supported upon the platform 51 between the support members 52 and 53 and below the guide rods 46 and 47. Said cylinder 57 is arranged so that its lengthwise axis lies within a plane substantially perpendicular to the guide rods 46 and 47, hence, substantially perpendicular to the rail 11. The power cylinder 57 is also arranged so that its piston rod 58 is extendable away from the rail 11. A slide bar 59 (Figures 1 to 5) is horizontally slidably supported upon the platform 51 below the power cylinder 57 for movement in a direction parallel with the axis of said power cylinder 57. The free end of the piston rod 58 is secured by the bracket 61 (Figure 3) to the outer (leftward) end of the slide bar 59, which end is remote from the rail 11. A pair of micro-switches 49 and 50 are mounted upon the platform 51 adjacent to the piston rod 58 for operation by an actuator 56 secured to said piston rod 58.

A pair of plates 62 and 63 (Figure 3) are mounted upon the inner end of the slide bar 59 in spaced parallel relationship with respect to each other and near the rail 11. Said plates 62 and 63 are elongated and disposed crosswise of the slide bar 59. A pair of engaging fingers 64 and 65 (Figure 5) are disposed between the plates 62 and 63 near the opposite ends thereof and extend in substantially the same direction from said plates toward the rail 11. A pair of pivot pins 67 and 68, which slidably extend through the fingers 64 and 65, respectively, are secured to, and extend between the plates 62 and 63. Shear pins 69, extending through both said plates and said fingers, prevent pivoting of said fingers 64 and 65 under normal conditions of operation.

The engaging fingers 64 and 65 (Figure 5) are spaced from each other, in this particular embodiment, a distance slightly greater than the length of the cable clamp 18. The fingers 64 and 65 each have a slot 70 into which the cable 28 is received when said fingers are caused to embrace a cable clamp 18. The power cylinder 57 (Figure 1) and slide bar 59 are arranged so that the plates 62 and 63 and fingers 64 and 65 are moved from a position, as appearing in broken lines in Figure 1, where they will not interfere in any way with the movement of the trolleys 17 along the rail 11, to a position as shown in solid lines in Figure 1, wherein they will snugly engage and embrace said cable clamp 18 of a trolley 17. The plates 62 and 63, and the fingers 64 and 65 combine to provide a trolley engaging or indexing head 66 on the inner end of the slide bar 59. The stroke of the power cylinder 41 is equal to, or an even multiple of, the distance between two successive conveyor trolleys. Thus, the engaging head 66 will move, or index, the conveyor trolleys 17, hence the conveyor cable 28 secured thereto, corresponding distances along the rail 11. However, it will be recognized that, where the cable is replaced by a chain or other connecting element having irregularities, such as links, the stroke of the cylinder 41 may be matched to the spacing of such irregularities. Furthermore, the engaging head 66 may be modified, or replaced by other structure, for engaging said connecting element or the irregularities thereon. For example, where the connecting element is a chain, the engaging head 66 may be replaced by structure including a single finger engageable with the links of said chain.

The power cylinder 41 (Figure 1) is connected by conduits 71 and 71a to a flow control device 72 whereby pressure fluid from a source 73 is directed in a predetermined manner by any convenient means to the ends of the power cylinder 41. The flow control device 72 may be operated with respect to the cylinder 41 in response to actuation of the micro-switches 49 and 50 (Figure 1), which are operated in a substantially conventional manner upon engagement by the actuator 56 as it moves with the piston rod 58. In this particular instance, actuation of the micro-switch 49 will cause the flow control device 72 to direct pressure fluid from the source 73 through the conduit 71a to the rearward end of the cylinder 41. In a similar manner, the micro-switch 50 is engageable by the actuator 56 whereby the flow control device 72 will be caused to direct fluid through the conduit 71 to the forward end of the power cylinder 41. The micro-switches 49 and 50, and the conduits 71 and 71a are arranged in this embodiment so that the conveyor mechanism 10 is "pulled" by a retraction of the piston 42. Where the load is relatively small, or the piston rod 42 is large in size, the connections could be arranged so that the conveyor mechanism is "pushed" by an extension of the piston 42.

The micro-switches 38 and 39 (Figure 1) are provided for operation by the platform 51, whereby the flow control 72 is caused to direct pressure fluid from the source 73 through the conduits 74 and 74a to the power cylinder 57. In this embodiment, the switch 38 causes fluid to flow through conduit 74a to the outer end of the cylinder 57, whereby the piston rod 58 is retracted, thereby causing the head 66 to move toward the cable 28.

It will be recognized that there are other methods of controlling the operation of the power cylinders 41 and 57 including pressure responsive mechanism and time delay mechanisms within the flow control device all of which may be provided in a conventional, well known manner.

*The positioning device*

Figure 6:
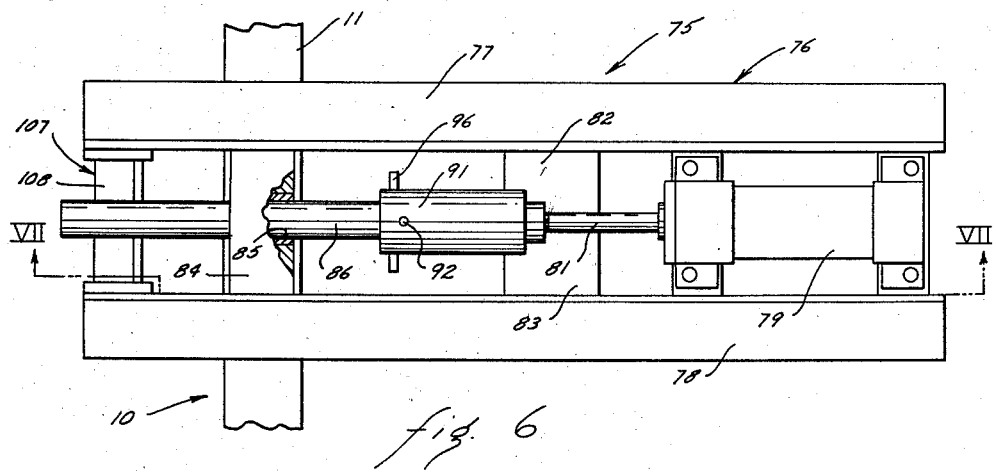
Figure 6 is a top plan view of a conveyor positioning device cooperable with said conveyor mechanism and said conveyor mounting apparatus.

The positioning device 75 (Figures 6 and 7) is comprised of a rectangular support frame 76 including a pair of spaced, parallel angle bars 77 and 78 which are secured upon and extend horizontally and perpendicularly from the rail 11. A power cylinder 79 is mounted upon said frame 76 on one side of said rail 11 and has a piston rod 81 arranged for extension toward, and retraction away from, the rail 11. A pair of guides 82 and 83 are mounted upon the angle bars 77 and 78, respectively, between the power cylinder 79 and the rail 11, and beneath the piston rod 81. Said guides 82 and 83 extend toward, but are spaced from, each other. A block 84 (Figure 6) is mounted upon the upper surface of the rail 11 and has a bushed opening 85 axially aligned with the piston rod 81. A guide shaft 86 is slidably received through the block 84 and is coaxially secured to the free end of the piston rod 81, as by means of the threaded opening 87 in the shaft 86 and the threaded pilot 88 on the end of the piston rod 81.

The positioning head 89 (Figure 7) includes an adjustment block 91 having a cylindrical opening through which the guide shaft 86 is slidably received. A set screw 92 (Figure 6) is provided in the adjustment block 91 for engaging the guide shaft 86 and thereby locking the adjustment block 91 in a selected position upon said guide shaft 86. An elongated, vertical member 93 having a T-shaped cross-section (Figure 8) in this particular embodiment, is secured at its upper end to the adjustment block 91 and extends downwardly therefrom. The web 94 of the member 93 is slidably and snugly disposed between the opposing faces of the guides 82 and 83. The flange 96 of said member 93 is disposed between said guides and the rail 11.

A substantially horizontal, V-shaped plate 97 (Figures 7, 8 and 9) is supported at its apex upon the lower end of the flange 96 and extends therefrom in a substantially horizontal direction toward a vertical plane defined by the web of the rail 11. The legs 98 and 99 of the V-shaped plate 97 are provided with end surfaces 101 and 102 which are engageable, substantially simultaneously, with the hooks 34 and 35, respectively. A yoke 103 (Figure 9) is supported upon the flange 96 above the V-shaped plate 97 and extends from said flange in the same direction as said V-shaped plate 97. Said yoke 103 has bifurcated arms 104 and 105, which are arranged for simultaneously and slidably, but snugly, embracing both the cable clamp 18 of a conveyor trolley 17 and the adjacent portion of the conveyor cable 28 in a manner similar to that described in detail hereinabove with respect to the engaging head 66 of the indexing apparatus 40. Said yoke 103 and V-shaped plate 97 are arranged so that the cable clamp 18 will be engaged by the yoke 103 at about the same time that the hooks 34 and 35 are engaged by the V-shaped plate 97. The outer ends of the arms 104 and 105 are beveled on their opposing surfaces to facilitate their engagement of the cable clamp 18.

A backing and guiding structure 107 (Figures 7, 8 and 9) is comprised of a backing frame 108 which is secured to the support frame 76 and extends downwardly therefrom on the opposite side of the rail 11 from the power cylinder 79. The elongated guide bar 109 is supported upon the backing frame 108 in a position close to, and substantially parallel with, the movement path of the cable clamp 18 of the conveyor trolley 17 (Figure 7), hence substantially in horizontal alignment with the yoke 103. A backing bar 111 is supported upon said backing frame 108 below, and substantially parallel with, the guide bar 109. Said backing bar 111 is preferably disposed slightly below the V-shaped plate 97. Accordingly, when the positioning head 89 is moved toward the backing and guiding structure 107, the yoke 103 engages the cable clamp 18 and conveyor cable 28 first, thereby approximately locating the conveyor trolley 17. Immediately after such engagement by the yoke 103, the end surfaces 101 and 102 of the V-shaped plate 97 engage the hooks 34 and 35, respectively, and press them firmly against the backing bar 111. The positioning head 89 is movable by the power cylinder 79 away from the trolley 17 a sufficient distance to prevent interference therebetween during the indexing movement of the conveyor trolley along the rail 11.

Figure 7:
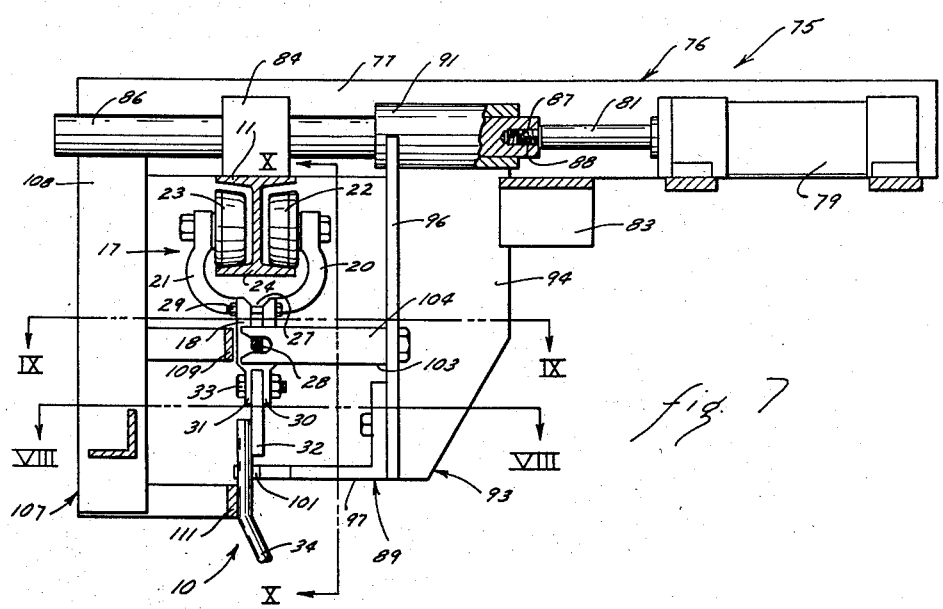
Figure 7 is a sectional view taken along the line VII—VII of Figure 6.

Figure 11 illustrates an alternate type of V-shaped plate 115 which may be utilized in conjunction with a backing bar 116 for positioning a single hook 117 suspended from means such as the conveyor trolley 17, shown in Figure 7.

Operation

For purposes of convenience, consideration will first be given to the operation of the indexing apparatus 40 with respect to the conveyor mechanism 10. As stated above, only those portions of rail 11 and conveyor cable 28, which are associated with the operation of the indexing apparatus 40, are shown in Figures 1 and 2. Thus, it will be recognized that both the rails and cable can extend through any length or path as desired or required by the particular application involved. The conveyor trolleys 17 will be uniformly disposed along the conveyor cable 28 at desired intervals, and the stroke of the power cylinder 41 will correspond to the spacing, or a multiple of the spacing, between adjacent conveyor trolleys 17 on said conveyor cable 28. The flow control device 72 is set so that it will operate the indexing apparatus 40 automatically.

If it is assumed that the indexing or engaging head 66 is in engagement with a cable clamp 18 (Figure 1) and the piston rod 42 is extended at the beginning of a period of operation, the actuator 56 will be operating the microswitch 49. Thus, energization of the electrical and hydraulic systems, associated with the conveyor mechanism will cause the flow control 72 to direct pressure fluid from source 73 through conduit 71a and thereby effect a retraction of the cylinder 41, whereby the cable 28 and load supported thereby is pulled forwardly along the rail 11. At a selected point in such movement, the platform 51 will engage switch 39, thereby causing the control 72 to terminate the flow of fluid through conduit 71a and to initiate the flow through conduit 74 to power cylinder 57, whereby its piston rod 58 is extended. This will cause the actuator 56 to engage the switch 50 which will cause the flow control 72 to direct pressure through conduit 71 to power cylinder 41. This will extend the piston rod 42 and thereby cause the platform 51 to be moved rearwardly along the guide rods 46 and 47 while the engaging head 66 remains in its retracted position as shown by broken lines in Figure 1.

When the piston rod 42 (Figure 1) reaches the rearward end of its stroke, the platform 51 will engage the switch 38, thereby terminating the flow of fluid through conduit 71. This will also cause the flow control 72 to direct fluid through the conduit 74a whereby the piston rod 58 will be retracted and the engaging head 66 thereby moved toward the rail 11, to engage the next conveyor trolley 17 along the conveyor cable, while also causing the actuator 56 to engage the switch 49. Operation of the switch 49 will terminate fluid flow in conduit 74a and cause the flow control 72 to direct fluid through conduit 71a whereby the piston rod 42 is again retracted by the power cylinder 41. This will move the platform 51 along the guide rods 46 and 47, and simultaneously move the trolley 17 along the rail with, and by the engaging head 66, thereby commencing another cycle of operation of the indexing apparatus 40.

As a result of the repeated operation of the power cylinders 41 and 57 in the above described manner, successive ones of the conveyor trolleys 17 disposed along the conveyor cable 28 and supported upon rail 11 will be engaged, moved and then released by the engaging head 66.

The positioning device 75 may be disposed along the conveyor mechanism 10 at a point either forwardly or rearwardly of the indexing apparatus 40. In either event, operation of the power cylinder 79 will be coordinated with the operation of the indexing apparatus 40, or other apparatus serving the purpose of the indexing apparatus 40, by means such as the flow control device 72. When one of the conveyor trolleys 17 reaches a work station along the rail 11, such as a loading station, which is opposite the positioning head 89, the power cylinder 79 will be operated to extend its piston rod 81 whereby the positioning head 89 will move toward said conveyor trolley in said station. Such movement will first cause the yoke 103 on the vertical member 93 of said positioning head 89 to engage the cable clamp 18. This engagement of the cable clamp not only provides a preliminary positioning of the trolley 17, but also prevents movement of said trolley, hence, the conveyor cable 28, away from the work station during the particular work, as loading operation.

Immediately after such engagement of the conveyor trolley 17 by said yoke 103, the V-shaped plate 97, which is also part of the positioning head 89, will engage the hooks 34 and 35 and force them against the backing bar 111, thereby positively positioning said hooks for whatever operation thereon, as loading, is desired. The accuracy by which the hooks 34 and 35 are thus located in the work station permits the use of fully automatic related equipment, not shown, which is entirely independent of the conveyor mechanism and indexing apparatus.

It will be recognized that without the positioning mechanism 75, such positive location would be impossible. This is due to the fact that the intermittent movement of the conveyor mechanism causes the conveyor trolleys 17, hence anything supported thereby to swing forwardly and rearwardly under the rail 11. The positioning device 75 thus serves the purpose of damping this swinging motion and at the same time of positively holding the hooks 34 and 35 in a definitely predetermined position for cooperation with independent apparatus effecting a desired operation.

It will be recognized that although the positioning device 75 has been specifically described in terms of utilization with respect to a loading station, it may be used with equal facility in connection with an unloading station or a station where a particular operation is to be performed upon the work piece supported by the hooks 34 and 35. It will also be recognized that although the positioning device 75 has been specifically described with respect to use with a pair of hooks for supporting the work piece, said device 75 may be used with a single hook 117, shown in Figure 11, or other supporting means within the scope of this invention.

It will also be observed that, although both the indexing apparatus 40 and the positioning device 75 are constructed for cooperation with conveyor trolleys 17 which are spaced along a cable, it will be apparent that the concept of the invention is also applicable to use with other types of conveyors, such as a chain conveyor or the like. Furthermore, the invention can be adapted, with only minor modifications, for use with other types of conveyor mechanisms. For example, the indexing apparatus can be arranged to advance a load connecting and engaging element along a relatively flat surface, such as a table, a ramp, or other type of load carrying bed. In a similar manner, the positioning device can be adapted to position all, or selected ones, of said loads with respect to a particular location on said surface or bed.

Thus, although particular preferred embodiments of the invention have been disclosed herein for illustrative purposes, it will be understood that variations or modifications thereof which lie within the scope of the invention are fully contemplated unless specifically stated to the contrary in the hereinafter appended claims.

We claim:

1. Apparatus for effecting intermittent movement of articles along a path, and for positively positioning one of said articles at a time between such movements thereof, the combination comprising: an elongated conveyor element disposed for movement along said path and having article engaging devices at uniform intervals therealong; an indexing head engageable with one of said devices at a time for moving said device and thereby moving said conveyor element along said path; first actuating mechanism effecting periodic reciprocation of said indexing head along said path; second actuating mechanism effecting intermittent movement of said indexing head toward and away from said path into and out of engagement with one of said devices, said movement toward said path occurring at one end of said reciprocation and movement away from said path occurring at the other end of said reciprocation; a positioning head; and third actuating mechanism timed with said first and second actuating mechanism for causing said positioning head to engage one of said devices during the interval between movements thereof along said path.

2. Apparatus for effecting intermittent advancement of a conveying mechanism along a path, comprising: an endless conveyor element movable along said path, said conveyor element having a series of article supporting means secured thereto at equally spaced intervals therealong; a first cylinder stationarily mounted alongside said conveyor element; a first piston rod reciprocable within said first cylinder and extending outwardly therefrom substantially parallel with said conveyor element; a carriage connected to said first piston rod and reciprocably movable therewith alongside said conveyor element; a second cylinder mounted on said carriage and extending transverse to said first piston rod toward said conveyor element; a second piston rod reciprocable within said second cylinder and extending outwardly thereof toward said conveyor element; means on the end of said second piston rod for drivingly engaging an article supporting means on said conveyor element; and control means for supplying fluid pressure to said cylinders in sequence to cause said second piston rod to be extended from said second cylinder to drivingly engage one of said article supporting means, to thereafter move said first piston rod within said first cylinder to move said carriage and thereby move said second cylinder and piston rod and the article supporting means engaged thereby and the conveyor element longitudinally of the axis of said conveyor element for a predetermined distance, to thereafter retract said second piston rod within said second cylinder and then to move said first piston rod and thereby said carriage and said second cylinder and piston to their original position.

3. Apparatus for effecting intermittent advancement of a conveying mechanism along a path, comprising: a cable type conveyor movable along said path, said conveyor having a series of article supporting means secured thereto at equally spaced intervals therealong; a stationary support frame mounted alongside a portion of said path, said support frame including a plurality of guide rods extending parallel with said path; a first cylinder stationarily mounted on said frame alongside said conveyor; a first piston rod reciprocable within said first cylinder and extending outwardly therefrom substantially parallel with said conveyor; a carriage connected to said first piston rod and slidably mounted on said guide rods for reciprocable movement with said first piston rod alongside said conveyor; a second cylinder mounted on said carriage and extending transverse to said first piston rod toward said conveyor; a second piston rod reciprocable within said second cylinder and extending outwardly thereof toward said conveyor, means on the end of said second piston rod for drivingly engaging an article supporting means on said conveyor; and control means for supplying fluid pressure to said cylinders to move the piston rods therein so that said engaging means on said second piston rod moves through a substantially rectangular path, said engaging means engaging an article supporting means during a portion of said rectangular movement thereof so that said conveyor is moved a predetermined distance during each cycle of operation.

4. An apparatus according to claim 3 wherein said engaging means on said second piston rod include a pair of longitudinally spaced fingers extending transversely of said conveyor, said fingers being engageable with the respective axial ends of said article supporting means.

5. An apparatus according to claim 3 wherein said control means include a pair of limit switches positioned respectively for actuation by said carriage at the respective ends of its movement; and means responsive to actuation of said limit switches to apply fluid pressure to said second cylinder.

6. A device for intermittently holding conveyor elements in a precisely determined, preselected position, comprising: an elongated conveyor element movable along a path, said conveyor element having a series of article supporting means secured thereto at equally spaced intervals therealong, said article supporting means including an upper member substantially coaxial with said conveyor element and a lower member spaced downwardly therefrom; a pair of stationary backup bars extending parallel with said conveyor element along one side thereof at a preselected position therealong, said backup bars being aligned respectively with the upper and lower members of said article supporting means on said conveyor; a positioning head positioned on the opposite side of said conveyor element from said backup bars, and movable transversely of said conveyor element, said positioning head having an upper section extending transversely of said conveyor element and aligned with the upper member of said article supporting means, said upper section being adapted to engage said upper member and hold same stationary, said positioning head also having a lower section aligned with the lower member of said article supporting means and engageable therewith; and a fluid pressure operated piston rod connected to said positioning head for moving said positioning head transversely of said conveyor element toward and away from said backup bars whereby the upper and lower section of said positioning head urges said upper and lower members of an article support means into contact with said backup bars to precisely position said article support means.

7. An apparatus according to claim 6 wherein said upper section of said positioning head includes a pair of longitudinally spaced arms extending transversely of said conveyor element, said arms being engageable, respectively, with the respective axial ends of said upper member; said lower section including cam means for engaging the lower member of said article supporting means to move same longitudinally into a precisely determined preselected position before said article support means is urged tightly against said backup bars.

8. Apparatus for intermittently advancing an elongated conveyor element along a predetermined path, comprising: a plurality of article supporting members secured to said conveyor element at uniform intervals therealong; an indexing head engageable with one of said members at a time for effecting movement of said conveyor element along its path; means supporting said indexing head for reciprocable movement along a portion of said path; first actuating mechanism for effecting reciprocation of said indexing head; second actuating mechanism for effecting intermittent movement of said indexing head into and out of engagement with said one member, said second actuating mechanism being supported upon said support means and moveable therealong with said indexing head; control mechanism for coordinating the operation of said actuating mechanisms whereby said indexing head moves through a substantially rectangular path; a positioning head arranged for engaging and holding one of said article supporting members substantially while said indexing head is disengaged from said members, a third actuating mechanism for effecting reciprocation of said positioning head toward and away from a position engaging said one article supporting member; means for operating said third actuating mechanism in response to movement of said first actuating mechanism.

References Cited in the file of this patent
UNITED STATES PATENTS

| | | |
|---|---|---|
| 1,907,894 | Stevens et al. | May 9, 1933 |
| 2,578,521 | Early | Dec. 11, 1951 |
| 2,766,873 | Brown et al. | Oct. 16, 1956 |
| 2,790,540 | Gaubert | Apr. 30, 1957 |
| 2,792,921 | Sharpe | May 21, 1957 |